(12) United States Patent
Zhong et al.

(10) Patent No.: US 11,156,065 B2
(45) Date of Patent: Oct. 26, 2021

(54) MINIMIZE TRAPPED FLUID IMPACT ON EXPANDABLE LINER HANGERS IN GEOTHERMAL APPLICATIONS

(71) Applicant: Halliburton Energy Services, Inc., Houston, TX (US)

(72) Inventors: Xiaoguang Allan Zhong, Plano, TX (US); Abdolreza Gharesi, Southlake, TX (US); Shengjun Yin, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 24 days.

(21) Appl. No.: 16/629,519

(22) PCT Filed: Mar. 11, 2019

(86) PCT No.: PCT/US2019/021664
§ 371 (c)(1),
(2) Date: Jan. 8, 2020

(87) PCT Pub. No.: WO2020/185208
PCT Pub. Date: Sep. 17, 2020

(65) Prior Publication Data
US 2021/0115764 A1    Apr. 22, 2021

(51) Int. Cl.
*E21B 23/01*    (2006.01)
*E21B 43/10*    (2006.01)

(52) U.S. Cl.
CPC ........... *E21B 43/106* (2013.01); *E21B 23/01* (2013.01)

(58) Field of Classification Search
CPC ...... E21B 43/103; E21B 43/105; E21B 23/01; E21B 43/10; E21B 43/108
See application file for complete search history.

(56) References Cited

U.S. PATENT DOCUMENTS 5,303,518 A * 4/1994 Strickland ............. E02D 29/124
                                                              52/21
6,029,748 A * 2/2000 Forsyth .................. E21B 43/105
                                                              166/380

(Continued)

FOREIGN PATENT DOCUMENTS

WO           20201852018            9/2020
WO    WO-2020185208 A1 *    9/2020    ........... E21B 43/103

OTHER PUBLICATIONS

ISRWO International Search Report and Written Opinion for PCT/US2019/021664 dated Dec. 12, 2019.

(Continued)

*Primary Examiner* — Daniel P Stephenson
(74) *Attorney, Agent, or Firm* — Scott Richardson; C. Tumey Law Group PLLC

(57) ABSTRACT

A system and method for performing subterranean operations. The system may comprise an expandable liner hanger positioned within a casing string, wherein the expandable liner hanger comprises a spiked portion having one or more anchoring ridges, each of the one or more anchoring ridges extending in a circular ring along an outer perimeter of the expandable liner hanger, and one or more weep holes are positioned in a space between adjacent ones of the one or more anchoring ridges. The method for coupling a liner to a casing string of a cased wellbore in a subterranean formation may comprise coupling an expandable liner hanger to the liner, inserting the liner and the expandable liner hanger downhole through the casing string, and expanding the plurality of anchoring ridges.

20 Claims, 4 Drawing Sheets

(56) References Cited

U.S. PATENT DOCUMENTS

| | | | |
|---|---|---|---|
| 6,098,717 | A | 8/2000 | Bailey et al. |
| 9,580,981 | B2 | 2/2017 | Zhong et al. |
| 2001/0045289 | A1 | 11/2001 | Cook et al. |
| 2001/0047866 | A1 | 12/2001 | Cook et al. |
| 2002/0139540 | A1 | 10/2002 | Lauritzen |
| 2005/0052019 | A1* | 3/2005 | Schroeder ............ F16L 23/125 285/13 |
| 2014/0174763 | A1 | 6/2014 | Zhong et al. |
| 2016/0090801 | A1 | 3/2016 | Hazelip et al. |

OTHER PUBLICATIONS

Netherlands Search Report and Written Opinion with Partial English Translation for Application No. 2024867 dated Jan. 5, 2021.

\* cited by examiner

MINIMIZE TRAPPED FLUID IMPACT ON EXPANDABLE LINER HANGERS IN GEOTHERMAL APPLICATIONS

BACKGROUND

During wellbore operations, it is typical to "hang" a liner onto a casing such that the liner supports an extended string of tubular below it. As used herein, "tubing string" refers to a series of connected pipe sections, casing sections, joints, screens, blanks, cross-over tools, downhole tools and the like, inserted into a wellbore, whether used for drilling, work-over, production, injection, completion, or other processes. A tubing string may be run in and out of the casing, and similarly, tubing string can be run in an uncased wellbore or section of wellbore. Further, in many cases a tool may be run on a wireline or coiled tubing instead of a tubing string, as those of skill in the art will recognize.

Expandable liner hangers may generally be used to secure the liner within a previously set casing or liner string. Expandable liner hangers may be "set" by expanding the liner hanger radially outward into gripping and sealing contact with the casing or liner string. For example, expandable liner hangers may be expanded by use of hydraulic pressure to drive an expanding cone, wedge, or "pig," through the liner hanger. Other methods may be used, such as mechanical swaging, explosive expansion, memory metal expansion, swellable material expansion, electromagnetic force-driven expansion, etc.

The expansion process may typically be performed by means of a setting tool used to convey the liner hanger into the wellbore. The setting tool may be interconnected between a work string (e.g., a tubular string made up of drill pipe or other segmented or continuous tubular elements) and the liner hanger. The setting tool may expand the liner hanger into anchoring and sealing engagement with the casing.

Current methods and systems may not be suitable for geothermal wells. Due to the temperature experienced in geothermal wells, fluid trapped between the liner hanger and the casing or liner string may expand. The expansion of this fluid may exert a force on the liner hanger which may cause the liner hanger to fail. Failure of the liner hanger may lead to reduced hanger hanging capacity and/or leaking within the production tubing.

BRIEF DESCRIPTION OF THE DRAWINGS

These drawings illustrate certain aspects of some of the embodiments of the present disclosure, and should not be used to limit or define the disclosure.

DETAILED DESCRIPTION

This disclosure presents systems and methods that may be performed in conjunction with a subterranean well and, specifically, for employing an expandable liner hanger system to be disposed in geothermal wells.

While the making and using of various examples of the present disclosure are discussed in detail below, a practitioner of the art will appreciate that the present disclosure provides applicable inventive concepts which can be embodied in a variety of specific contexts. The specific embodiments discussed herein are illustrative of specific ways to make and use the disclosure and do not limit the scope of the present disclosure.

The description is provided with reference to a vertical wellbore; however, the embodiments disclosed herein can be used in horizontal, vertical or deviated wellbores.

As used herein, the words "comprise," "have," "include," and all grammatical variations thereof are each intended to have an open, non-limiting meaning that does not exclude additional elements or steps. It should be understood that, as used herein, "first," "second," "third," etc., are arbitrarily assigned, merely differentiate between two or more items, and do not indicate sequence. Furthermore, the use of the term "first" does not require a "second," etc. The terms "uphole," "downhole," and the like, refer to movement or direction closer and farther, respectively, from the wellhead, irrespective of whether used in reference to a vertical, horizontal or deviated borehole.

The terms "upstream" and "downstream" refer to the relative position or direction in relation to fluid flow, again irrespective of the borehole orientation. As used herein, "upward" and "downward" and the like are used to indicate relative position of parts, or relative direction or movement, typically in regard to the orientation of the figures, and does not exclude similar relative position, direction or movement where the orientation in-use differs from the orientation in the figures.

Figure 1:
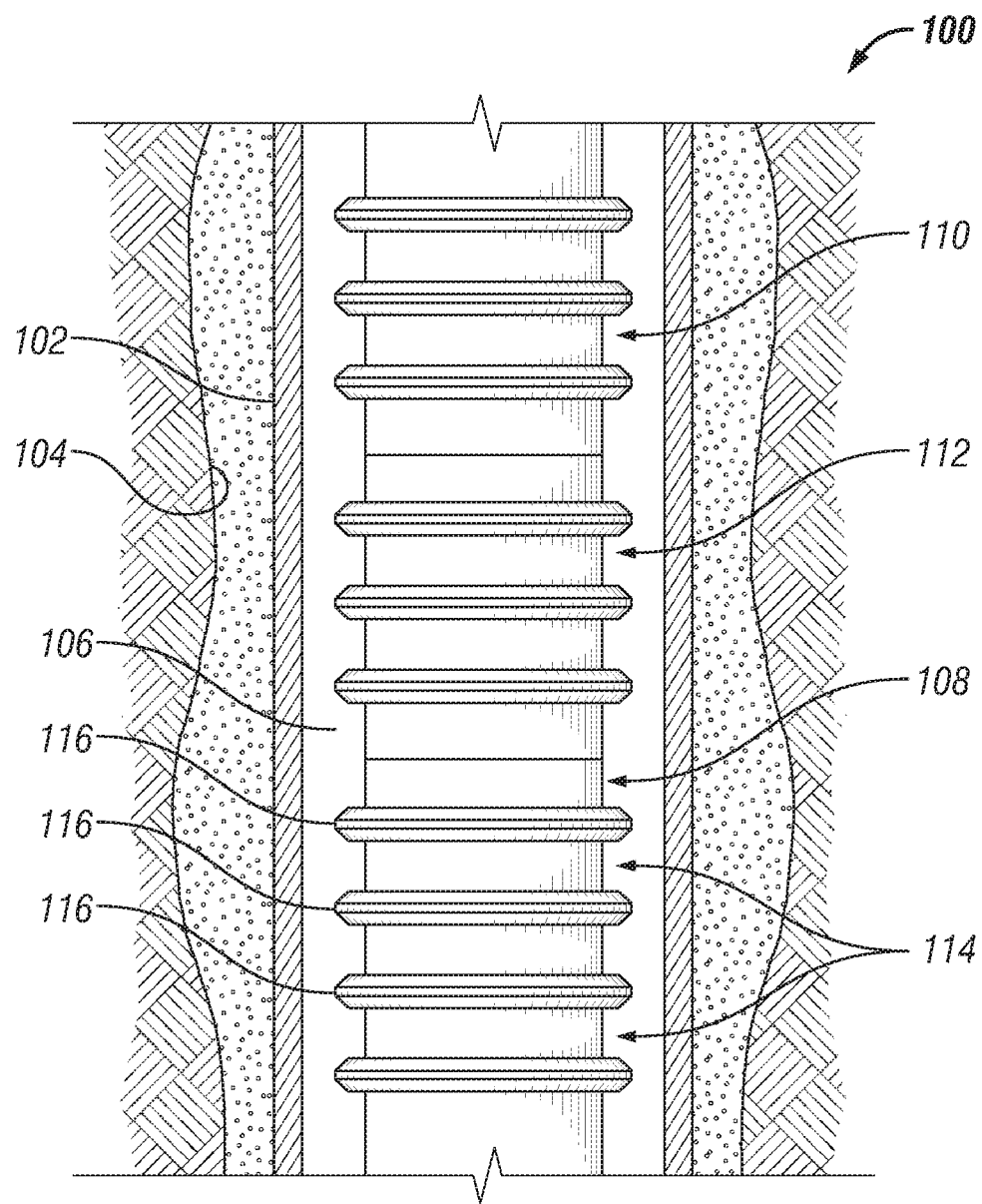
FIG. 1 is a schematic diagram of an example of a formation testing tool on a wireline.

FIG. 1 illustrates an example of an expandable liner hanger system 100. In expandable liner hanger system 100, a casing string 102 has been installed and cemented within a wellbore 104. An expandable liner hanger 108 may be hung, extending downhole from a lower end of casing string 102. An annulus 106 may be created between casing string 102 and a work string 110. In embodiments, an expandable liner hanger 108 may support additional wellbore casing, operational tubulars or tubing strings, completion strings, downhole tools, etc., for positioning at greater depths.

As used herein, the terms "liner," "casing," and "tubular" are used generally to describe tubular wellbore items, used for various purposes in wellbore operations. Liners, casings, and tubulars may be made from various materials (metal, plastic, composite, etc.), can be expanded or unexpanded as part of an installation procedure, and may be segmented or continuous. It is not necessary for a liner or casing to be cemented into position. Any type of liner, casing, or tubular may be used in keeping with the principles of the present disclosure.

As further illustrated in FIG. 1, expandable liner hanger 108 may be sealed and secured at an upper end of casing string 102. Alternatively, expandable liner hanger 108 may be sealed and secured above a window (not shown) formed through a sidewall of casing string 102, with expandable liner hanger 108 extending outwardly through the window into a branch or lateral wellbore. Without limitation, many different configurations and relative positions of casing string 102 and expandable liner hanger 108 may be possible.

In examples, as also shown in FIG. 1, a setting tool 112 may be connected proximate expandable liner hanger 108 on work string 110. Work string 110 may convey setting tool 112 and expandable liner hanger 108 into wellbore 104, conduct fluid pressure and flow, transmit torque, tensile and compressive force, etc. Setting tool 112 may facilitate conveyance and installation of expandable liner hanger 108, in part by using the torque, tensile and compressive forces, fluid pressure and flow, etc., as delivered by work string 110.

In FIG. 1, expandable liner hanger 108 is illustrated with a plurality of anchoring ridges 116 positioned on and attached to expandable liner hanger 108. In examples, when expandable liner hanger 108 may be expanded, such as with an expansion cone, discussed below, into anchoring and sealing engagement with casing string 102, the plurality of anchoring ridges 116 engage the interior of casing string 102. It should be noted that in examples rubber elements may be used in conjunction with anchoring ridges 116. However, in a geothermal well, expandable liner hanger 108 may experience swings in temperature, specifically, increases in temperature during geothermal well operations which may be detrimental to maintaining contact between expandable liner hanger 108 and casing string 102. This may be due to fluid expansion exerting a force on expandable liner hanger 108. For example, the body of expandable liner hanger 108 and anchoring ridges 116 may confine and trap fluid against casing string 102. As temperatures fluctuate and rise in a geothermal well, the fluid may expand, which may push against casing string 102, expandable liner hanger 108, and anchoring ridges 116. This may in turn lead anchoring ridges 116 dislodging from casing string 102 and the ultimate failure of expandable liner hanger 108.

Figure 2:
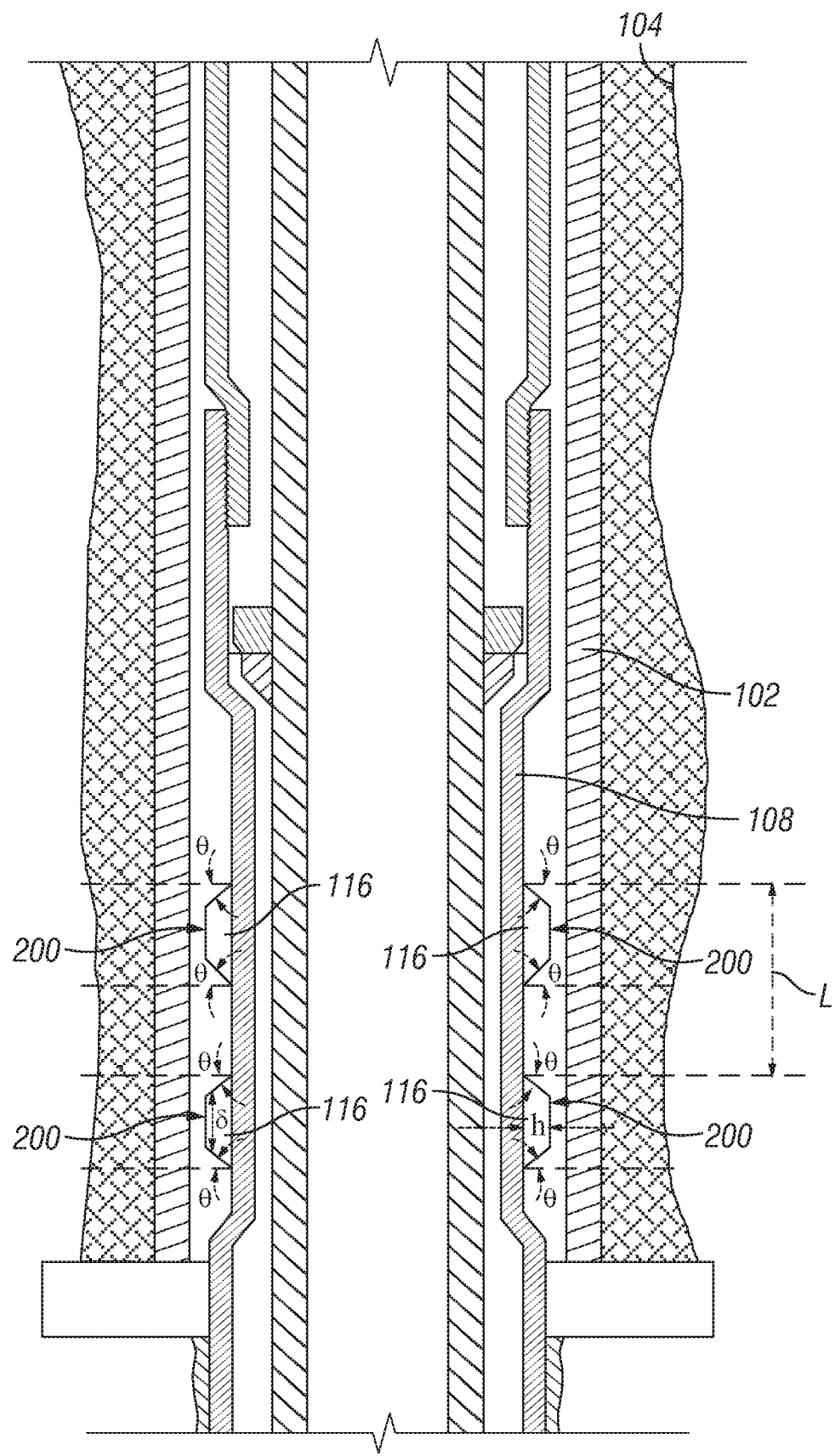
FIG. 2 is a cross-sectional view of a liner hanger system disposed in a wellbore.

FIG. 2 depicts a cross-sectional view of expandable liner hanger 108 and anchoring ridges 116. Without limitation, anchoring ridges 116 may be metal spikes. The metal spikes may be made of any suitable steel grade, aluminum, any other ductile material, and a combination thereof. In certain implementations, the spikes may be made from a combination of one or more of the recited materials. In certain embodiments, anchoring ridges 116 may be made from AISI4140 steel or AISI4340 steel. In examples, each anchoring ridge 116 may be a circular ring that extends along an outer perimeter of expandable liner hanger 108 at a desired axial location. However, the present disclosure is not limited to this particular configuration of anchoring ridges 116. For instance, in certain embodiments, anchoring ridges 116 may extend along an axial direction of expandable liner hanger 108. Moreover, in certain implementations, different anchoring ridges 116 may have different surface geometries without departing from the scope of the present disclosure. Specifically, a first spike may extend along an outer perimeter of expandable liner hanger 108 at a first axial position along expandable liner hanger 108 and a second spike may extend along an outer perimeter of expandable liner hanger 108 at a second axial position along expandable liner hanger 108.

In examples, anchoring ridges 116 may be formed using any suitable methods known to those of ordinary skill in the art. For instance, in certain implementations, anchoring ridges 116 may be formed by machining the body of expandable liner hanger 108. However, the present disclosure is not limited to machined spikes. Without limitation, any suitable methods known to one of ordinary skill in the art may be used to form anchoring ridges 116. For instance, in examples, anchoring ridges 116 may be formed as a separate structure that may be coupled to expandable liner hanger 108 using any suitable coupling mechanisms known to one of ordinary skill in the art. Moreover, any number of anchoring ridges 116 may be formed along the axial direction of expandable liner hanger 108. The number of anchoring ridges 116 formed along the axial direction of expandable liner hanger 108 may depend upon a number of factors such as, for example, the anchor load that is desired to be reached.

Accordingly, each of anchoring ridges 116 provide a metal-to-metal seal between expandable liner hanger 108 and casing string 102. In examples, anchoring ridges 116 may have a flat top portion 200. The use of anchoring ridges 116 with a flat top portion 200 as opposed to pointed spikes or threads may be beneficial because flat anchoring ridges 116 may be less sensitive to casing variations and have a higher load capacity than pointed spikes. Anchoring ridges 116 may be symmetrically aligned such that an angle θ is the same on both sides of each anchoring ridges 116 as shown in FIG. 2. However, in examples, the angle θ may be different on the opposing sides of anchoring ridges 116 without departing from the scope of the present disclosure. The angle θ is referred to herein as the "spike angle." In examples, the spike angle (θ) is selected such that after expansion, anchoring ridges 116 remain substantially normal to expandable liner hanger 108 body. For instance, in certain implementations, the spike angle (θ) may be selected to be in a range of from approximately 30° to approximately 70°.

Moreover, as shown in FIG. 2, the dimension δ denotes the width of flat portion 200 of anchoring ridges 116 and is referred to herein as the spike width (δ). The spike width (δ) may be selected as desired such that expandable liner hanger 108 may expand without significant increase in expansion pressure while maintaining optimum contact area between anchoring ridges 116 and casing string 102. Specifically, as anchoring ridges 116 are expanded, flat portion 200 of the spike interfaces with the inner surface of casing string 102 and may eventually couple expandable liner hanger 108 to casing string 102. As shown in FIG. 2, the spacing between the anchoring ridges 116 along the length of expandable liner hanger 108 is denoted as "L". The distance between the spikes (L) may be configured such that the deformation zones in casing string 102 induced by the anchoring ridges 116 may be isolated. The distance (L) may be selected to maximize the hanging capacity per spike. The term "hanging capacity" as used herein refers to the maximum downward load (anchor load) a hanger can carry without inducing an appreciable relative motion between the expandable liner hanger 108 and casing string 102 after the hanger is set in the casing. Accordingly, in certain implementations, it may not be desirable for the distance between the spikes (L) to fall below a certain threshold value. For instance, in examples, it may not be desirable for the distance between the spikes (L) to be less than three times the thickness of casing string 102. Accordingly, the distance (L) between anchoring ridges 116 has an optimum value which is dependent upon a number of factors including, but not limited to, the outer diameter of the hanger (hanger OD), the hanger wall thickness, the inner diameter of the casing (casing ID) and the casing wall thickness. Moreover, the available length of expandable liner hanger 108 may limit the number of anchoring ridges 116 that may be placed thereon. Beyond this optimum value an increase in the distance (L) may no longer improve the hanging capacity per anchoring ridges 116.

The height (H) of anchoring ridges 116 (and their resulting outer diameter (OD)) may be selected so that it is between an upper and a lower boundary. The upper spike height boundary may be selected as a function of the amount of flow area that is desired around expandable liner hanger. In contrast, the lower spike height boundary may be selected as a function of the distance desired between expandable liner hanger 108 and casing string 102. Moreover, if the spike height is too large, it may destroy downhole equipment as it expands and if the spike height is too low, it wouldn't be able to support a liner as required. Configuration of the height (H) may cause a significant deformation of anchoring ridges 116 and an appreciable localized plastic deformation of the casing. Once anchoring ridges 116 of expandable liner hanger 108 are expanded, anchoring ridges 116 and the inner diameter of casing string 102 form multiple metal-to-metal seals. Accordingly, anchoring ridges 116 of expandable liner hanger 108 provide mechanical support for expandable liner hanger 108.

Figure 3:
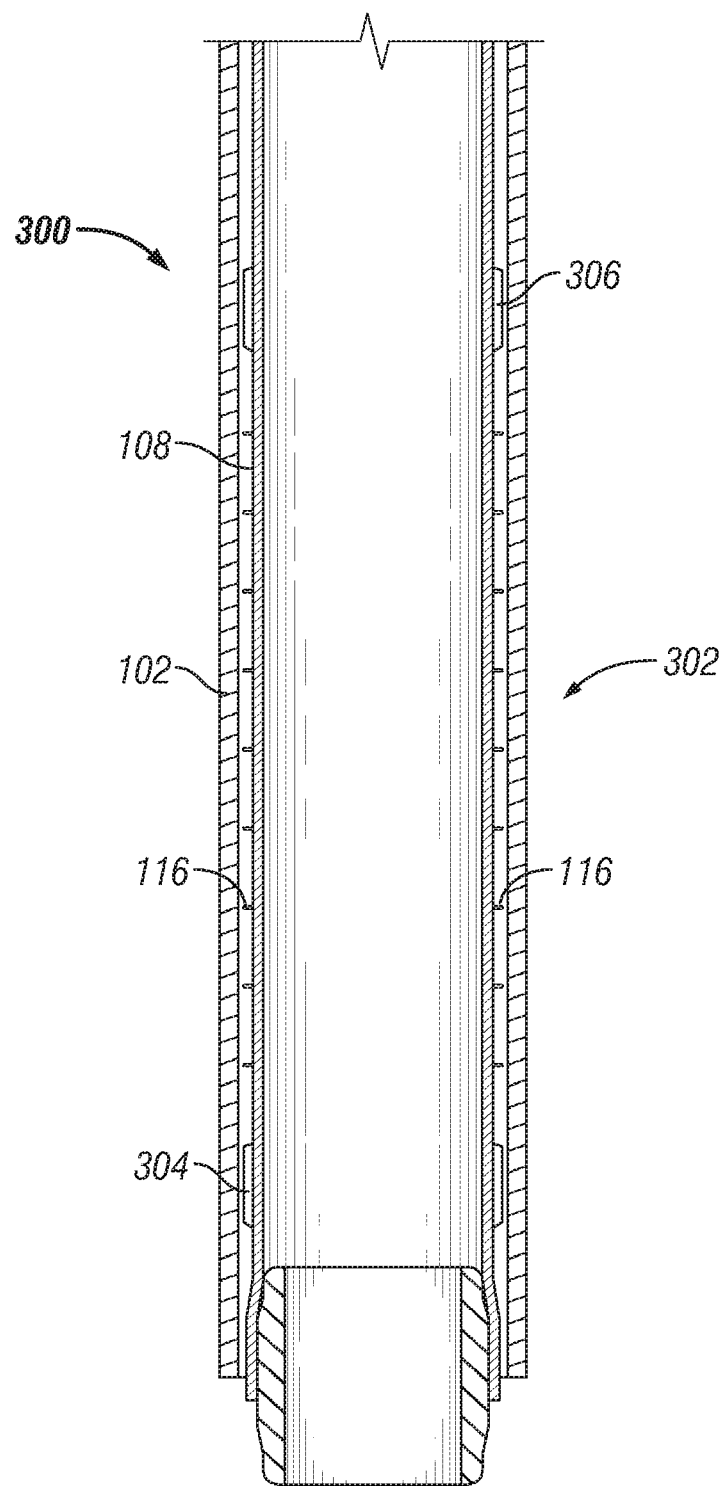
FIG. 3 is a cross-sectional view of one or more anchoring ridges of an expandable liner hanger disposed in the wellbore before expansion of the expandable liner hanger.

FIG. 3 depicts a partial cross-sectional view of an expandable liner hanger 108 having anchoring ridges 116 in accordance with another implementation of the present disclosure. Anchoring ridges 116 may be configured in the same manner discussed above in conjunction with FIG. 2. Anchoring ridges 116 may be metal spikes. In examples, each anchoring ridge 116 may be a circular ring that extends along an outer perimeter of expandable liner hanger 108. The anchoring ridges 116 may be formed using any suitable methods known to those of ordinary skill in the art. For instance, in certain implementations, anchoring ridges 116 may be formed by machining the body of expandable liner hanger 108. Moreover, any number of anchoring ridges 116 may be formed along the axial direction of expandable liner hanger 108. The number of anchoring ridges 116 formed along the axial direction of expandable liner hanger 108 may depend upon a number of factors such as, for example, the anchor load that is desired to be reached. Accordingly, each anchoring ridges 116 may provide a metal-to-metal seal between expandable liner hanger 108 and casing string 102.

In accordance with this implementation, a sealing element may be positioned at a desired location and utilized in conjunction with the anchoring ridges 116. In examples, a sealing element 300 may be placed at an axial position on expandable liner hanger 108 above and/or below the anchoring ridges 116. The axial section of the liner hanger that contains the anchoring ridges 116 may be referred to herein as spiked portion 302. In the illustrative embodiment of FIG. 3, a first sealing element 304 and a second sealing element 306 may be positioned at distal ends of spiked portion 302. The placement of a sealing element 300 at one or both distal ends of the spiked portion 302 of expandable liner hanger 108 may provide redundancy and pressure integrity for the system. This redundancy may be particularly beneficial in instances when one or more of the leading anchoring ridges 116 are damaged when expandable liner hanger 108 is being directed downhole.

Sealing element 300 may be made of any suitable material, including, but not limited to, rubber, extremely ductile metals (e.g., AISI type 316L stainless steel), other polymeric materials, or any other pliable material known to those of ordinary skill in the art. With the liner hanger anchoring ridges 116 in an expanded position, sealing element 300 may reinforce the seal between expandable liner hanger 108 and casing string 102. As illustrated in FIG. 3, sealing element 300 may be particularly beneficial in instances when installed in a large size casing having a pronounced inner diameter weld seam or a galled casing inner diameter.

Without limitation, there may be any number of sealing elements 300 and sealing elements 300 may be positioned at any desired location along expandable liner hanger 108. For example, a sealing element 300 may be positioned at an axial position on expandable liner hanger 108 uphole relative to the spiked portion and/or one sealing element 300 may be positioned at an axial position on expandable liner hanger 108 downhole relative to spiked portion 302. In examples, sealing element 300 may be positioned such that there are equal number of anchoring ridges 116 provided uphole and downhole relative to sealing element 300.

The metallic anchoring ridges 116 of expandable liner hanger 108 may be less susceptible to degradation than traditional elastomeric seals, current technology, when exposed to high temperatures and/or pressures downhole of a geothermal well. Moreover, flat portion 200 of anchoring ridges 116 may minimize the sensitivity of expandable liner hanger 108 to variations for a given weight casing. Accordingly, expandable liner hanger 108 may provide several advantages. For example, expandable liner hanger 108 may improve anchor load carrying capacity and may reduce costs associated with performing operations using a liner hanger. Specifically, the use of anchoring ridges for anchoring ridge 116 instead of elastomeric seals reduces the need for replacement of elastomeric elements necessitated by performance of subterranean operations in HTHP environments downhole.

With continued reference to FIG. 3, without limitation, expandable liner hanger 108 may reduce the possibility of extruding long elastomers beyond anchoring ridge 116 during expansion of expandable liner hanger 108. Specifically, as expandable liner hanger 108 expands, anchoring ridges 116 and one or more sealing elements 300 may also move until they touch an Inner Diameter "ID" of casing string 102. As the expansion of expandable liner hanger 108 continues, sealing elements 300 may be compressed along an axis of expandable liner hanger 108 and stretched along the perimeter of expandable liner hanger 108 due to pressure applied to it by expandable liner hanger 108, the inner wall of casing string 102 and the anchoring ridges 116 located at its two opposing lateral ends. Consequently, as sealing element 300 may be compressed, it may eventually spill over anchoring ridges 116 located at its lateral ends. However, as anchoring ridges 116 are also pushed out by expandable liner hanger 108, they cut off the spilled portion of sealing element 300 and the new compressed volume of sealing element 300 may be trapped between expandable liner hanger 108 and casing string 102.

Figure 4:
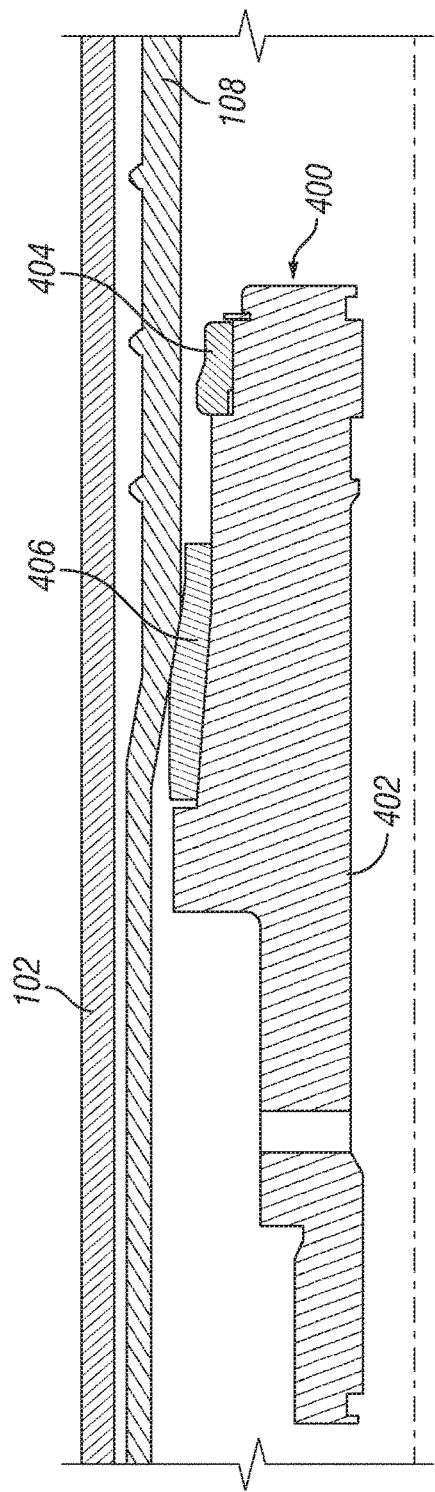
FIG. 4 is a cross-sectional view of a cone mandrel disposed in an expandable liner hanger.

FIG. 4 illustrates expansion cone 400 which may function to expand expandable liner hanger 108 to casing string 102 as discussed above. As illustrated, expansion cone 400 may include a cone mandrel 402 which may act as a structural and foundation for cone nut 404 and collapsible cone 406. In examples, cone nut 404 may function to facility cone pull out when expansion is completed, and setting tool is retrieved. In examples, collapsible cone 406 may function to facilitate cone outside diameter to reduce during pull out. For example, collapsible cone 406 may reduce the force needed to pull expansion cone 400 out. Collapsible cone 406 may be formed by disjoined segments of "petals" riding on cone mandrel 402 during expansion. When expansion is completed, during pull out, segments of collapsible cone 406 may disengage from cone mandrel ramp, and subsequently its effective outside diameter is reduced, enabling expansion cone 400 to be pulled out after expansion operations of expandable liner hanger 108. During operations, collapsible cone 406 may exert force on expandable liner hanger 108. The force exerted on expandable liner hanger 108 by collapsible cone 406 may drive anchoring ridges 116 into casing string 102. Anchoring ridges 116 may be disposed into casing string 102 and may hold to casing string 102 as described above.

Figure 5:
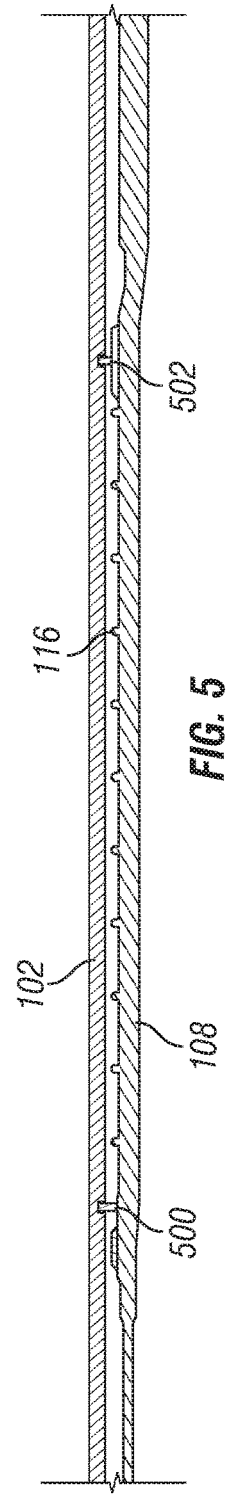
FIG. 5 is a cross-sectional view of an expandable liner hanger disposed in the wellbore after expansion.

During geothermal operations, fluid trapped between expandable liner hanger body 108 and casing string 102 may expand as temperatures within the well rise, for example between 300° F. to 650° F. The expansion of fluid may exert a force against expandable liner hanger body 108. The exertion of force against expandable liner hanger body 108 may cause loss of contact pressure between anchoring ridges 116 and casing string 102. FIG. 5 illustrates an example of measured results due to the expansion of fluid between casing string 102 and expandable liner hanger body 108. As illustrated, each anchoring ridge 116 may be disconnected from casing string 102, except for first anchoring ridge 500 and last anchoring ridge 502. This may allow expandable liner hanger 108 to continue to function during geothermal well operations but at a reduced capacity.

Figure 6:
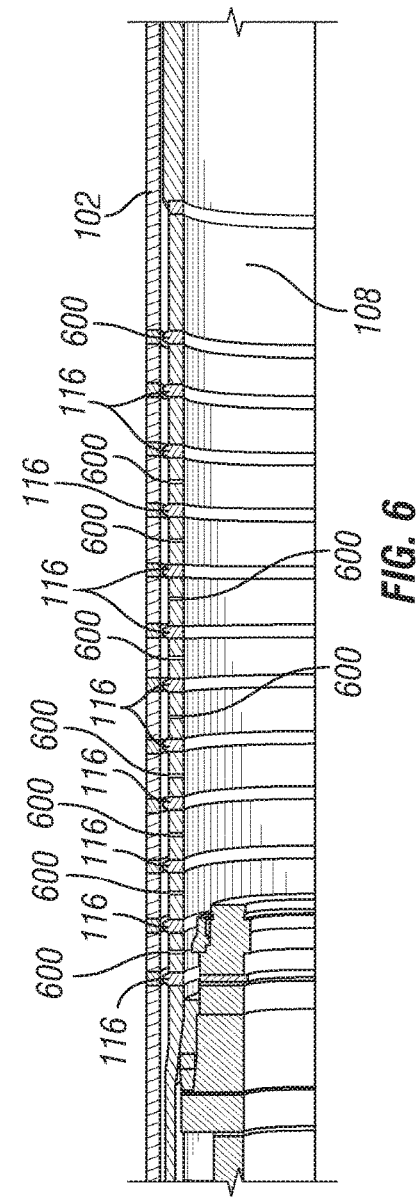
FIG. 6 illustrated one or more weep holes disposed in the expandable liner hanger between the one or more anchoring ridges.

FIG. 6 illustrates a system and method that may be utilized to prevent the expansion of fluid from disengaging expandable liner hanger 108 from casing string 102. As illustrated, expandable liner hanger 108 may be modified and/or formed with weep holes 600. In examples, weep holes 600 may be disposed and/or drilled between anchoring ridges 116. Without limitation, there may be any number of weep holes 600 drilled into expandable liner hanger 108. As illustrated, weep holes 600 may be disposed about 180 degrees apart. However, weep holes 600 may be disposed at any suitable angle from each other, for example, about 90 degrees, about 45 degrees, about 30 degrees, about 15 degrees to about thirty degrees, about 45 degrees to about 90 degrees, about 100 degrees to about 130 degrees, or about 145 degrees to about 180 degrees. Additionally, weep holes 600 may be about 0.1 inch (0.254 cm) in diameter and for example about 0.05 inch (0.127 cm) to about 0.15 inch (0.381 cm). In examples, the diameter of weep holes 600 may be about five percent of the space between each anchoring ridge. Without limitation, weep holes 600 may be between about two percent to about ten percent of the space between each anchoring ridge. While, illustrated as circular in nature, weep holes 600 may be any suitable shape, such as square, rectangular, oval, and may have any suitable length and/or height. Weep holes 600 may function by allowing fluid trapped between casing string 102 and expandable liner hanger 108 to expand into the interior of expandable liner hanger 108 during geothermal well operation.

It should be noted that each anchoring ridge 116 is individually a sealing element and anchoring element. Therefore, weep holes 600 may not jeopardize expandable liner hanger 108 sealing capabilities for annulus flow during operation or its anchoring capabilities. In examples, the last one or two intervals between anchoring ridges 116 at one or both ends of expandable liner hanger 108 may be left intact without weep holes 108, which may prevent leaks from forming between the annulus 106 (e.g., referring to FIG. 1) and the interior of expandable liner hanger 108.

Weep holes 600 may allow for expandable liner hanger 108 to be more robust in geothermal applications and specifically during high temperature swing conditions. During geothermal well operations, weep holes 600 may allow for the expansion of fluid from through one or more weep holes 600 and into the interior of liner hanger 108. This may prevent fluid from exerting force on expandable liner hanger 108 in such amounts that may lead to the disengagement of anchoring ridges 116 from casing string 102.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

Statement 1. A system for performing subterranean operations may comprise an expandable liner hanger positioned within a casing string, wherein the expandable liner hanger comprises a spiked portion having one or more anchoring ridges, each of the one or more anchoring ridges extending in a circular ring along an outer perimeter of the expandable liner hanger; wherein the one or more anchoring ridges are tapered to a flat portion, wherein at least one of the one or more anchoring ridges are expandable, and wherein the flat portion of each of the one or more anchoring ridges deforms the casing string when the anchoring ridge is in the expanded position, wherein each of the one or more anchoring ridges provides a seal between the expandable liner hanger and the casing string when the anchoring ridge is in the expanded position; and one or more weep holes are positioned in a space between adjacent ones of the one or more anchoring ridges.

Statement 2. The system of statement 1, wherein the one or more weep holes comprise two weep holes that are disposed 180 degrees apart.

Statement 3. The system of statements 1 or 2, wherein each of the one or more weep holes have a diameter about five percent of the space between the first anchoring ridge and the second anchoring ridge.

Statement 4. The system of statements 1-3, wherein the one or more weep holes comprise two weep holes that are disposed 45 degrees apart.

Statement 5. The system of statements 1-4, wherein the one or more anchoring ridges are made from a material selected from a group consisting of aluminum, steel, and a combination thereof.

Statement 6. The system of statements 1-5, wherein expanding the one or more anchoring ridges couples the liner hanger to the casing.

Statement 7. The system of statements 1-6, wherein an anchoring ridge angle of the one or more anchoring ridges is selected such that the one or more anchoring ridge is substantially normal to the expandable liner hanger when the anchoring ridge is in the expanded position.

Statement 8. The system of statements 1-7, further comprising a sealing element, wherein the sealing element is positioned at a distal end of the spiked portion.

Statement 9. The system of statement 8, wherein the sealing element is selected from a group consisting of rubber, polymeric materials and ductile metals.

Statement 10. The system of statements 1-8, wherein the one or more anchoring ridges comprise a first anchoring ridge positioned at a first axial location along the expandable liner hanger and a second anchoring ridge positioned at a second axial location along the expandable liner hanger.

Statement 11. A method for coupling a liner to a casing string of a cased wellbore in a subterranean formation comprising: coupling an expandable liner hanger to the liner, wherein the expandable liner hanger comprises a spiked portion having a plurality of anchoring ridges tapered to a flat portion and wherein one or more weep holes are disposed between adjacent ones of the plurality of anchoring ridges; inserting the liner and the expandable liner hanger downhole through the casing string; and expanding the plurality of anchoring ridges such that the plurality of anchoring ridges causes deformation of the casing string and provide a seal between the expandable liner hanger and the casing string, and wherein expanding the plurality of anchoring ridge couples the expandable liner hanger to the casing string.

Statement 12. The method of statement 11, wherein the one or more weep holes comprise two weep holes disposed 180 degrees apart.

Statement 13. The method of statements 11 or 12, wherein each of the one or more weep holes have a diameter about five percent of the space between the first anchoring ridge and the second anchoring ridge.

Statement 14. The method of statements 11-13, wherein the one or more weep holes comprise two weep holes that are disposed 45 degrees apart.

Statement 15. The method of statements 11-14, further comprising a sealing element, wherein the sealing element is selected from a group consisting of rubber, polymeric material, and ductile metals.

Statement 16. The method of statements 11-15, wherein an anchoring ridge angle of one or more of the plurality of anchoring ridges is selected such that the one or more of the plurality of anchoring ridges is substantially normal to the expandable liner hanger when in the expanded position.

Statement 17. The method of statements 11-16, further comprising a sealing element, wherein the sealing element is positioned at a distal end of the spiked portion.

Statement 18. The method of statements 11-17, wherein the plurality of anchoring ridges extend in a circular ring along an outer perimeter of the expandable liner hanger, wherein one of the plurality of anchoring ridges is positioned at a first axial location along the expandable liner hanger and a second of the plurality of anchoring ridges is positioned at a second axial location along the expandable liner hanger.

Statement 19. The method of statements 11-18, wherein at least one of the plurality of anchoring ridges is formed by machining.

Statement 20. The method of statements 11-19, wherein at least one of the plurality of anchoring ridges is made from a material selected from a group consisting of Aluminum, steel, and a combination thereof.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present embodiments are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A system for performing subterranean operations comprising:
    an expandable liner hanger positioned within a casing string, wherein the expandable liner hanger comprises a spiked portion having anchoring ridges, each of the anchoring ridges extending along an outer perimeter of the expandable liner hanger; wherein the anchoring ridges are tapered to a flat portion, wherein at least one of the anchoring ridges is expandable, and wherein the flat portion of each of the anchoring ridges is operable to deform the casing string when the anchoring ridge is in the expanded position, wherein each of the anchoring ridges is operable to provide a seal between the expandable liner hanger and the casing string when the anchoring ridge is in the expanded position; and
    weep holes disposed along a length of the expandable liner hanger, wherein the anchoring ridges are disposed along the length of the expandable liner hanger such that the anchoring ridges are staggered with the weep holes, wherein the last one or two intervals between the anchoring ridges at one or both ends of the expandable liner hanger are without any of the weepholes.

2. The system of claim 1, wherein two weep holes are disposed 180 degrees apart.

3. The system of claim 1, wherein the one or more anchoring ridges are made from a material selected from a group consisting of aluminum, steel, and a combination thereof.

4. The system of claim 1, wherein expanding the one or more anchoring ridges couples the liner hanger to the casing.

5. The system of claim 1, wherein an anchoring ridge angle of the one or more anchoring ridges is selected such that the one or more anchoring ridge is substantially normal to the expandable liner hanger when the anchoring ridge is in the expanded position.

6. The system of claim 1, further comprising a sealing element, wherein the sealing element is positioned at a distal end of the spiked portion.

7. The system of claim 6, wherein the sealing element is selected from a group consisting of rubber, polymeric materials, and ductile metals.

8. The system of claim 1, wherein the one or more anchoring ridges comprise a first anchoring ridge positioned at a first axial location along the expandable liner hanger and a second anchoring ridge positioned at a second axial location along the expandable liner hanger.

9. A system for performing subterranean operations comprising:
    an expandable liner hanger positioned within a casing string, wherein the expandable liner hanger comprises a spiked portion having one or more anchoring ridges, each of the one or more anchoring ridges extending along an outer perimeter of the expandable liner hanger; wherein the one or more anchoring ridges are tapered to a flat portion, wherein at least one of the one or more anchoring ridges is expandable, and wherein the flat portion of each of the one or more anchoring ridges is operable to deform the casing string when the anchoring ridge is in the expanded position, wherein each of the one or more anchoring ridges is operable to provide a seal between the expandable liner hanger and the casing string when the anchoring ridge is in the expanded position; and
    one or more weep holes are positioned in a space between adjacent ones of the one or more anchoring ridges, wherein each of the one or more weep holes has a diameter about five percent of the space between a first anchoring ridge and a second anchoring ridge.

10. A system for performing subterranean operations comprising:
- an expandable liner hanger positioned within a casing string, wherein the expandable liner hanger comprises a spiked portion having one or more anchoring ridges, each of the one or more anchoring ridges extending along an outer perimeter of the expandable liner hanger; wherein the one or more anchoring ridges are tapered to a flat portion, wherein at least one of the one or more anchoring ridges is expandable, and wherein the flat portion of each of the one or more anchoring ridges is operable to deform the casing string when the anchoring ridge is in the expanded position, wherein each of the one or more anchoring ridges is operable to provide a seal between the expandable liner hanger and the casing string when the anchoring ridge is in the expanded position; and
- one or more weep holes are positioned in a space between adjacent ones of the one or more anchoring ridges, wherein the one or more weep holes comprise two weep holes that are disposed 45 degrees apart.

11. A method for coupling a liner to a casing string of a cased wellbore in a subterranean formation comprising:
- coupling an expandable liner hanger to the liner, wherein the expandable liner hanger comprises a spiked portion having a plurality of anchoring ridges tapered to a flat portion and wherein weep holes are disposed along a length of the expandable liner hanger, wherein the anchoring ridges are disposed along the length of the expandable liner hanger such that the anchoring ridges are staggered with the weep holes, wherein the last one or two intervals between the anchoring ridges at one or both ends of the expandable liner hanger are without any of the weepholes;
- inserting the liner and the expandable liner hanger downhole through the casing string; and
- expanding the plurality of anchoring ridges such that the plurality of anchoring ridges causes deformation of the casing string and provide a seal between the expandable liner hanger and the casing string, and wherein expanding the plurality of anchoring ridge couples the expandable liner hanger to the casing string.

12. The method of claim 11, wherein two weep holes are disposed 180 degrees apart.

13. The method of claim 11, further comprising a sealing element, wherein the sealing element is selected from a group consisting of rubber, polymeric material, and ductile metals.

14. The method of claim 11, wherein an anchoring ridge angle of one or more of the plurality of anchoring ridges is selected such that the one or more of the plurality of anchoring ridges is substantially normal to the expandable liner hanger when in the expanded position.

15. The method of claim 11, further comprising a sealing element, wherein the sealing element is positioned at a distal end of the spiked portion.

16. The method of claim 11, wherein the plurality of anchoring ridges extend in a circular ring along an outer perimeter of the expandable liner hanger, wherein one of the plurality of anchoring ridges is positioned at a first axial location along the expandable liner hanger and a second of the plurality of anchoring ridges is positioned at a second axial location along the expandable liner hanger.

17. The method of claim 11, wherein at least one of the plurality of anchoring ridges is formed by machining.

18. The method of claim 11, wherein at least one of the plurality of anchoring ridges is made from a material selected from a group consisting of aluminum, steel, and a combination thereof.

19. A method for coupling a liner to a casing string of a cased wellbore in a subterranean formation comprising:
- coupling an expandable liner hanger to the liner, wherein the expandable liner hanger comprises a spiked portion having a plurality of anchoring ridges tapered to a flat portion and wherein one or more weep holes are disposed between adjacent ones of the plurality of anchoring ridges;
- inserting the liner and the expandable liner hanger downhole through the casing string; and
- expanding the plurality of anchoring ridges such that the plurality of anchoring ridges causes deformation of the casing string and provide a seal between the expandable liner hanger and the casing string, and wherein expanding the plurality of anchoring ridge couples the expandable liner hanger to the casing string, wherein each of the one or more weep holes has a diameter about five percent of the space between a first anchoring ridge and a second anchoring ridge.

20. A method for coupling a liner to a casing string of a cased wellbore in a subterranean formation comprising:
- coupling an expandable liner hanger to the liner, wherein the expandable liner hanger comprises a spiked portion having a plurality of anchoring ridges tapered to a flat portion and wherein one or more weep holes are disposed between adjacent ones of the plurality of anchoring ridges;
- inserting the liner and the expandable liner hanger downhole through the casing string; and expanding the plurality of anchoring ridges such that the plurality of anchoring ridges causes deformation of the casing string and provide a seal between the expandable liner hanger and the casing string, and wherein expanding the plurality of anchoring ridge couples the expandable liner hanger to the casing string, wherein the one or more weep holes comprise two weep holes that are disposed 45 degrees apart.

* * * * *